United States Patent [19]

Kummler et al.

[11] 4,304,628
[45] Dec. 8, 1981

[54] RADIOLYTIC PROCESS FOR DERIVATION OF A SYNTHETIC FUEL ELEMENT FROM AN INPUT GAS

[75] Inventors: Ralph H. Kummler, Birmingham; Charles B. Leffert, Troy, both of Mich.

[73] Assignee: Texas Gas Transmission Corporation, Owensboro, Ky.

[21] Appl. No.: 14,890

[22] Filed: Feb. 26, 1979

[51] Int. Cl.³ .......................... G21B 1/00; G21G 1/06
[52] U.S. Cl. ........................ 376/148; 204/157.1 H; 423/415 A; 423/579; 276/324
[58] Field of Search ........................ 176/1, 9, 42 R, 39; 423/415 R, 415 A, 579; 204/157.1 H

[56] References Cited

U.S. PATENT DOCUMENTS

| | | | |
|---|---|---|---|
| 1,163,922 | 12/1915 | Hillhouse | 423/415 A |
| 3,802,993 | 4/1974 | Fredersdorff | 423/579 |
| 3,907,980 | 9/1975 | Pangborn | 423/579 |
| 3,969,631 | 7/1976 | Winsche et al. | 176/9 |
| 4,064,024 | 12/1977 | Lee | 204/157.1 H |
| 4,121,984 | 10/1978 | Gomberg et al. | 204/157.1 H |
| 4,132,727 | 1/1979 | Gomberg | 176/9 |
| 4,144,150 | 3/1979 | Gomberg et al. | 204/157.1 H |
| 4,175,016 | 11/1979 | Lewis et al. | 204/157.1 H |

OTHER PUBLICATIONS

Advances in Sci. & Tech., vol. 1 (1962), Steinberg, pp. 309, 312-313.

*Primary Examiner*—Harvey E. Behrend
*Attorney, Agent, or Firm*—Laurence R. Brown

[57] ABSTRACT

Combustible synthetic fuel is produced by radiolytic separation of a raw material gas such as $CO_2$ having a combustible element CO by exposure to neutron radiation in the presence of an intermixed inert gas such as helium. The helium serves both to absorb radiation energy for transfer to the raw material gas thereby increasing available energy and also serves as a dilutant which decreases possibilities of explosive recombination of dissociated elements thereof, and the mixture provides a convenient carrier vehicle from which the desired synthetic fuel element can be separated efficiently by methods known in the existing state of technology.

5 Claims, 2 Drawing Figures

RADIOLYTIC PROCESS FOR DERIVATION OF A SYNTHETIC FUEL ELEMENT FROM AN INPUT GAS

TECHNICAL FIELD

The invention relates to an improved process for deriving synthetic fuel components from low cost non-fossil gaseous fuel raw material sources by radiolysis preferably from neutron energy such as available from fusion reactions.

More specifically the invention provides for derivation of CO from $CO_2$ by exposure to radiolysis.

BACKGROUND ART

At the present stage of the art thermonuclear fusion reactions are excited by laser ignition or magnetically confined plasma processes to yield neutrons.

The released fusion energy for these two processes is in the form of very energetic ($\sim 14$ MeV) neutrons. It is important to convert this kinetic energy to a useful form efficiently without degrading it all to the low thermal energy level of steam for the Rankine cycle.

It has heretofore been proposed that water may be dissociated to produce hydrogen and carbon dioxide to produce carbon monoxide radiolytically by neutron radiation, and various patents and patent applications in this field have been issued to the assignee of this invention.

It has also been proposed that the gaseous additive $NO_2$ in mixture with $CO_2$ can serve as an inhibitor to prevent explosive back reaction of the dissociated elements such as CO and $O_2$. Also, $SF_6$ has been used as an additive. A paper reporting on the radiolysis kinetics of $CO_2$ summarizing various literature reports was published with the inventor as a co-author in connection with the ACS Symposium on Numerical Methods in Kinetics in New Orleans, March, 1977 (PO-D-77-152).

The article entitled "A Numerical Model of Carbon Dioxide Radiolysis" by R. Kummler et al., published in the *Journal of Physical Chemistry*, 81,2451 (1977), sets forth the general state of the art and literature in the field in which this invention is made.

Thus, considerable theoretical and experimental research effort has been expended in an effort to increase the yields of desirable end products produced by neutron radiolysis. This invention is directed to an improved and safe method of deriving a synthetic fuel component from radiolytically dissociated gases.

DISCLOSURE OF THE INVENTION

In accordance with one embodiment of this invention the raw material gas $CO_2$ is mixed with the inert gas He and exposed to neutron radiation for dissociation of the $CO_2$ into CO and $O_2$ with the synthetic fuel element CO being the desired end product separated from the resulting He, CO, $O_2$, $CO_2$ mixture. The He serves both as an energy absorber-transfer medium producing more of the neutron energy from fast neutrons available in fusion reactions for dissociating the $CO_2$ gas elements, and further it serves as a dilutant which lessens the chance for any explosive recombination.

BEST MODE FOR CARRYING OUT THE INVENTION

Figure 1:
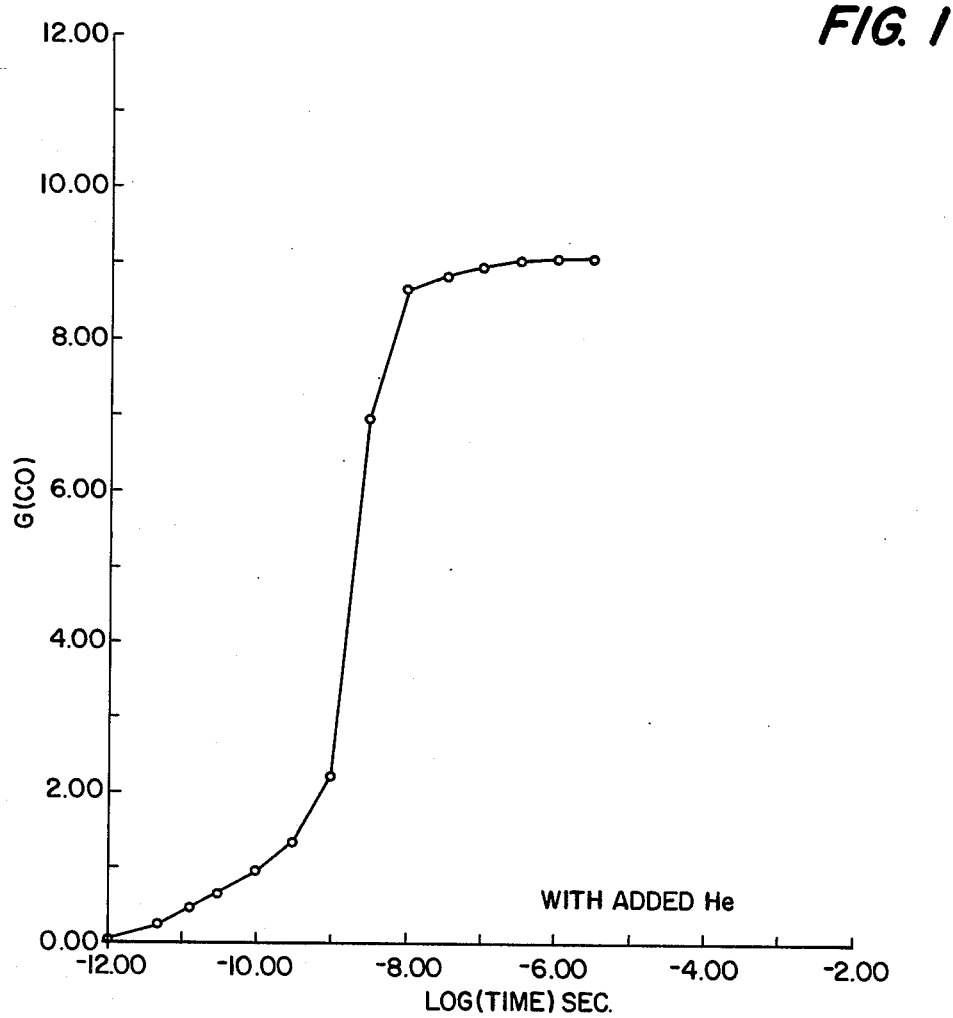
FIG. 1 is a graph obtained from a computer simulation of operating experiments showing achievement of a G(CO) of the order of 9 obtained with the He/$CO_2$ mixture proposed herein.

In the preferred process mode provided in accordance with the present invention, neutron radiation derived from a fusion reaction is the radiation source. Thus, a mixture of He and $CO_2$ is injected into a chamber receiving high energy neutron radiation from the fusion reaction of a thermonuclear reactor, preferably of the laser ignited D-T pellet class. Other radiation sources could be used.

Radiation exposure of the He during the thermonuclear reaction yields helium ions, excited states and thermally hot electrons. Some $CO_2$ parent and secondary ions and excited states are also created as in prior art $CO_2$ radiolysis processes.

These $CO_2$ related species created in the energy deposition process with only $CO_2$ with prior art gaseous techniques and mixtures yield CO at radiolytic efficiencies designated by G(CO) levels which reach a limitation in the order of 7.8 with high dose rates as reported in the previously identified paper.

Reference can be made to U.S. Pat. No. 4,064,024, R. A. Lee, issued Dec. 20, 1977, wherein $SF_6$ is a gaseous additive to a $CO_2$-$NO_2$ mixture for increasing the yield of CO in a radiolysis process about 30%.

It is an object of this invention to improve the G(CO) level.

Furthermore, as the concentration of CO and $O_2$ increases in a mixture the tendency of recombination is a limitation on the yield G(CO).

It is a further object of this invention to reduce the effect of recombination in the radiolysis process for deriving CO from $CO_2$.

Thus, by adding He with a concentration ratio He/$CO_2$ such that most of the radiation energy is absorbed in the He, the transfer of that energy to the $CO_2$ increases the efficiency of CO yield and thus the G(CO).

Other inert gases can be used but helium produces the highest conversion efficiency when used as a transfer medium in the manner stated.

Additionally there is a decreased probability of any explosion caused by recombination of the CO and $O_2$.

The lower limit of inflammability of CO in $O_2$ at one atmosphere and room temperature is 15.5% (Handbook of Chemistry and Physics, 51st Edition, p. D-83). Thus, in a pure $CO_2$ radiolysis system the yields might be constrained in some process steps to less than 15.5%. In a $CO_2$/He system high yields of $CO_2$ conversion to CO, i.e. approaching 100% may be achieved without creating similar difficulties.

An understanding of the principles believed to be involved in this invention as presently advised and understood can be obtained as follows. The ionization potentials and the excitation potentials of the ions and excited states of the rare gases are quite well known and are given in Table 1.

TABLE 1

| | Energy States in Irradiated Rare Gases (in eV) | | | | |
|---|---|---|---|---|---|
| R | $R^+$ | | $R^*$ | $R_2^+$ | $R_2^*$ (bands) |
| He | 24.58 | $^2S_{\frac{1}{2}}$ | 19.81 $S_1$ <br> 20.61 $^1S_0$ | 23.3 | 13.9 [c] |

TABLE 1-continued

| | Energy States in Irradiated Rare Gases (in eV) | | | |
|---|---|---|---|---|
| R | R+ | R* | $R_2^+$ | $R_2^*$ (bands) |
| Ne | 21.56 $^2P_{3/2}$ | 21.21 $^1P_1$ | 20.9 | 10.6 [c] |
| | 21.66 $^2P_{\frac{1}{2}}$ | 16.61 $^3P_2$ | | |
| | | 16.67 $^3P_1$ | | |
| | | 16.71 $^3P_0$ | | |
| | | 16.84 $^1P_1$ | | |
| Ar | 15.75 $^2P_{3/2}$ | 11.56 $^3P_2$ | 14.7 | 9.5 [c] |
| | 15.93 $^2P_{\frac{1}{2}}$ | 11.62 $^3P_1$ | | 5.2 [d] |
| | | 11.72 $^3P_0$ | | |
| | | 11.82 $^1P_0$ | | |
| | | 14.1, 14.3 [e] | | |
| Kr | 14.00 $^2P_{3/2}$ | 9.91 $^3P_2$ | 13.0 | 8.3 [c] |
| | 14.66 $^2P_{\frac{1}{2}}$ | 10.03 $^3P_1$ | | 4.0 [d] |
| | | 10.56 $^3P_0$ | | |
| | | 10.64 $^1P_1$ | | |
| Xe | 12.13 $^2P_{3/2}$ | 8.31 $^3P_2$ | 11.2 | 7.0 [c] |
| | 13.43 $^2P_{\frac{1}{2}}$ | 8.43 $^3P_1$ | | 3.6 [d] |
| | | 9.44 $^3P_0$ | | |
| | | 9.57 $^1P_1$ | | |

Higher lying excited states will decay collisionly and by radiative transitions down to the lower lying states. The $3P_1$ and $1P_1$ states are normally considered to be unstable because of their short radiative lifetime. At high pressure (P > 1.0 ATM), however, that radiation will be trapped and therefore we can treat these states as if they were metastable states. The $3P_0$ and $3P_2$ states are metastable according to the $\Delta J = 1$ selection rule. Once an excited state is formed it can react with a ground state rare gas atom, R, to produce the dimer ion $R_2^+ + e$, and the excited state can also react in three-body fashion with ground state rare gas atoms to form the excimer, $R_2^*$. Excimer formation has been found to occur even by reactions of the lowest resonant state of xenon. Therefore it is assumed all rare gas excited states are probably capable of forming excimers. The ions $R^{30}$ will also react in a three-body fashion with ground state rare gas atoms to form the dimer ion $R_2^+$. This termolecular process is much faster than the formation of excimers. The dimer ions react with electrons to form a lower lying excited state $R^*$. The excimer species, having no ground state, is lost primarily by radiation.

If a foreign gas such as $CO_2$ is introduced to this system, several additional reactions will occur. Since the ionization potential of $CO_2$ is lower than the ionization potential for any of the rare gases, except xenon, and because the ionization potential is lower than the excited state energies of helium and neon, it is possible for charge transfer to occur from any rare gas ion whose ionization potential is greater than that of $CO_2$, and it is also possible for chemi-ionization to occur as the excited state energy of the rare gas atom is greater than the ionization potential of $CO_2$. In the case of helium ion and argon, the dimer ion can also charge transfer to $CO_2$.

The major features of the $He/CO_2$ interaction may be stated briefly as follows. The system concentrations are selected such that most of the ionization and excitation energy which goes into helium eventually winds up in the minor species, $CO_2$. Therefore, the efficiency of production of CO remains at least as great as in a pure $CO_2$ system, despite the greatly lowered concentration of $CO_2$. However, in addition, the charge transfer reactions involving $He^+$ and $CO_2$ are dissociative in nature and therefore, an increase in the G(CO) is expected as a result of the dissociative charge transfer processes. The same is true of the Penning ionization reactions involving $He^*$. In addition, the electrons which do not have enough energy to ionize or excite helium, and are therefore called sub-excitation electrons, do have sufficient energy to ionize and excite $CO_2$. Hence, an incremental addition to the G value will be obtained from these sub-excitation electrons.

The primary G values for the helium system are presented in Table 2.

TABLE 2

| Primary G Values in Helium | |
|---|---|
| $He^{30} + e$ | G = 2.41 |
| $He^*$ (singlet) | G = 1.44 |
| $He^*$ (triplet) | G = 0.20 |

The stopping power for 1 MeV electrons per gram is 1.10 for He compared to $CO_2$ as 1.00, which for molecular weights of 4 and 44 respectively, gives 34.5% of the energy deposited in $CO_2$ and 65.5% in helium for a 5% volume $CO_2$ system. For a 10% $CO_2$ by volume system, 52.6% of the energy is deposited in $CO_2$ and 47.4% in helium. Hence, in order to maintain any enhancement of the helium ion and excited state chemistry, the volume percent of $CO_2$ must be maintained at approximately 5%. Using the G values in Table 2, and assuming that

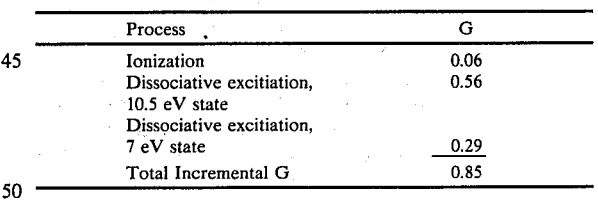

we see that a net of 2CO are produced for every $He^+$ formed and $He^*$ does the same, then $G(CO) \leq 8.1$ in $He/CO_2$ mixture, i.e., $$G(C) \leq 2G(He^+ + He^*).$$

An incremental G(CO) is expected from subexcitation electrons. The incremental subexcitation G values can be estimated as follows:

| Process | G |
|---|---|
| Ionization | 0.06 |
| Dissociative excitiation, 10.5 eV state | 0.56 |
| Dissociative excitiation, 7 eV state | 0.29 |
| Total Incremental G | 0.85 |

This increment would permit a maximum theoretical $G(CO) \leq 9$, compared to 7.8 obtained in the best $CO_2$ radiolysis systems (Kummler, et al., 1977). Since the theoretical estimates are approximations, the maximum observed G(CO) could be somewhat higher or lower.

In FIG. 1 the results of computer analysis of experiments show that under realistic operating conditions the G(CO) is increased to 9.

Figure 2:
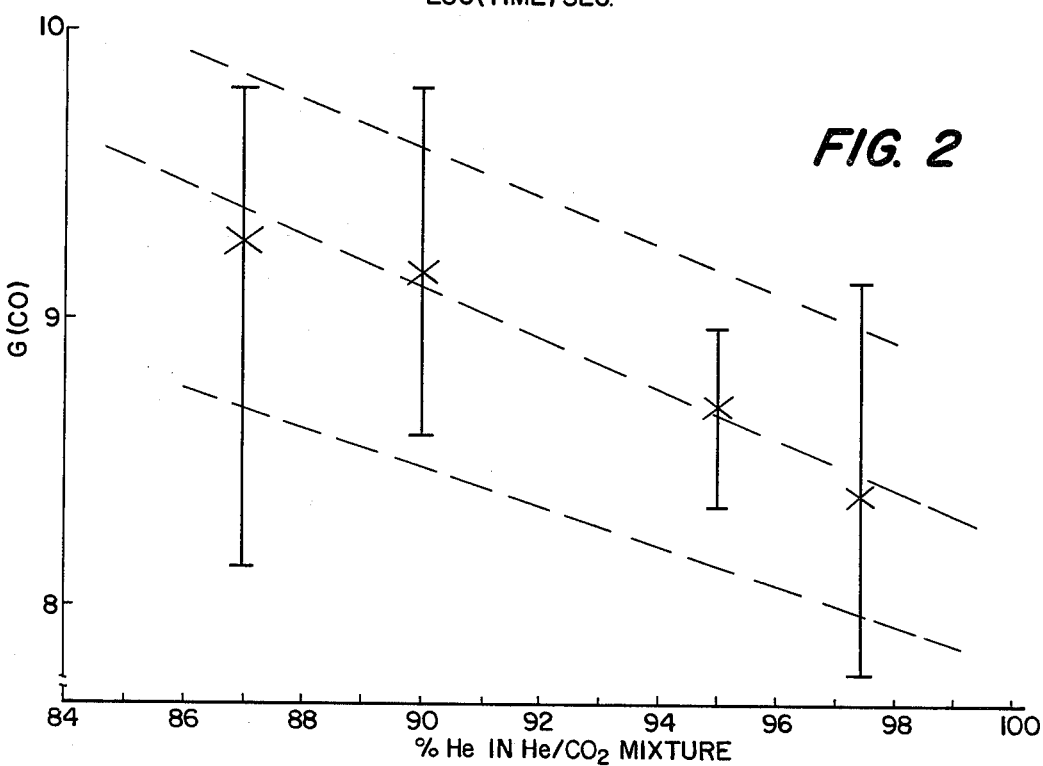
FIG. 2 is a graph showing experimental test results confirming a G(CO) in the order of 9 for various He/$CO_2$ mixtures.

The graph of FIG. 2 developed from observations obtained in tests confirms the expected yield with a routine scatter of the actual data illustrating by the compiled trend line the effect of changes in the amount of helium.

Industrial Applicability

Because of the need to replace fossil fuels with synthesized combustible fuels, it is desirable to develop from commonly available resources such as $CO_2$ a combustible fuel component CO which can be converted by the well known water gas process to $H_2$ for recycling the $CO_2$ and thus provides a basis for developing fuels from a common low cost available substance. Since radiolysis techniques are well known in the art, the radiolysis can currently be achieved, and the fusion reaction process provides an excellent radiation source in the form of high intensity neutrons, which can be used to convert available power into tangible fuel substances on a commercial basis as the efficiency of the fusion processes increases.

The article entitled "A Numerical Model of Carbon Dioxide Radiolysis" by R. Kummler et al., published in the *Journal of Physical Chemistry*, 81,2451 (1977), sets forth the general state of the art and literature in the field in which this invention is made.

We claim:

1. A radiolytic process for deriving synthetic combustible fuel components from a separable constituent of an input gas having constituents dissociated in the presence of radiation comprising in combination the steps of,
   (a) mixing an inert gas that absorbs radiolytic energy with said input gas in an amount such that most of the radiation energy is absorbed in the inert gas,
   (b) exposing said mixture to neutron radiation for absorption by said inert gas and transfer of absorbed energy to said input gas thereby to dissociate its constituents by both direct radiation and energy transfer from radiation absorbed in said inert gas and reduce chances for explosive recombination of said dissociatable constituents,
   (c) and recovering from said mixture after said exposure said separable constituent from an atmosphere of said inert gas.

2. The process defined in claim 1 wherein the input gas is $CO_2$ and the recovered separable constituent is CO.

3. The process defined in claim 2 wherein the inert gas is helium.

4. The process of dissociating a gaseous compound into its constituents radiolytically in the presence of radiation comprising the steps of mixing the compound in an atmosphere with an inert gas with sufficient inert gas to absorb most of the radiation energy, providing a radiolytic energy exchange from the radiation to the mixture of the inert gas and the compound sufficient to dissociate constituents of the compound by the radiolytic energy absorbed by the inert gas and retaining the dissociated constituents for recovery in mixture with said inert gas, thereby impeding reverse association of the dissociated constituents of the compound.

5. The process of mixing an inert gas that absorbs radiolytic energy with a radiolytically dissociatable raw material gas in a proportion to absorb most of the radiolytic energy in the inert gas and deriving by exposure of the inert gas to radiolytic energy from energy absorbed by the inert gas from the radiolytic exposure a dissociated constituent of the raw material gas from the mixture subsequent to the exposure.

* * * * *